United States Patent
Farooque et al.

(10) Patent No.: US 7,396,603 B2
(45) Date of Patent: Jul. 8, 2008

(54) INTEGRATED HIGH EFFICIENCY FOSSIL FUEL POWER PLANT/FUEL CELL SYSTEM WITH CO$_2$ EMISSIONS ABATEMENT

(75) Inventors: Mohammad Farooque, Danbury, CT (US); Fred C. Jahnke, Rye, NY (US)

(73) Assignee: FuelCell Energy, Inc., Danbury, CT (US)

( * ) Notice: Subject to any disclaimer, the term of this patent is extended or adjusted under 35 U.S.C. 154(b) by 794 days.

(21) Appl. No.: 10/860,740

(22) Filed: Jun. 3, 2004

(65) Prior Publication Data
US 2005/0271914 A1      Dec. 8, 2005

(51) Int. Cl.
*H01M 8/06* (2006.01)
*H01M 8/04* (2006.01)

(52) U.S. Cl. .............................. 429/19; 429/26; 429/34
(58) Field of Classification Search .......................... None
See application file for complete search history.

(56) References Cited

U.S. PATENT DOCUMENTS

| | | | |
|---|---|---|---|
| 5,232,793 A | 8/1993 | Miyauchi et al. | |
| 6,187,465 B1 | 2/2001 | Galloway | |
| 7,118,606 B2 * | 10/2006 | Labinov et al. | 48/127.9 |
| 2004/0115492 A1 * | 6/2004 | Galloway | 429/17 |
| 2006/0024538 A1 * | 2/2006 | Steinberg | 429/17 |

\* cited by examiner

*Primary Examiner*—John S Maples
(74) *Attorney, Agent, or Firm*—Cowan, Liebowitz, Latman, P.C.

(57) ABSTRACT

An integrated power production system including a fossil fuel power plant for processing fossil based fuel such as coal or natural gas arranged in tandem with a carbonate fuel cell having an anode and a cathode section. The flue gas of the power plant serves exclusively as the inlet gas for the cathode section of the fuel cell. Anode exhaust gas leaving the anode section of the fuel cell is subjected to processing including sequestration of the carbon dioxide in the exhaust gas.

17 Claims, 3 Drawing Sheets

INTEGRATED HIGH EFFICIENCY FOSSIL FUEL POWER PLANT/FUEL CELL SYSTEM WITH CO₂ EMISSIONS ABATEMENT

BACKGROUND OF THE INVENTION

This invention relates to fuel cell systems and, in particular, to integrated fuel cell and fossil fuel power plant systems having enhanced efficiency.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. Molten carbonate fuel cells operate by passing a reactant fuel gas through the anode, while oxidizing gas comprising carbon dioxide and oxygen is passed through the cathode.

Fossil fuel power plants produce energy by combusting fossil fuels, such as coal or natural gas. As a result of the combustion process, fossil fuel power plants generate flue gas, which is often disposed of by atmospheric emissions. Such emissions, however, are harmful to the environment because they contain large amounts of carbon dioxide which contributes to global warming and climate changes.

Accordingly, a number of approaches have been used to control or limit carbon dioxide content in the flue gas emissions from fossil fuel power plants. However, the process of separating the carbon dioxide from the flue gas is not cost effective because of the low concentration of carbon dioxide (approximately 10%) in the gas.

A system is disclosed in U.S. Pat. No. 5,232,793 in which carbon dioxide emissions in the flue gas of a fossil fuel power plant are reduced by using a carbonate fuel cell in tandem with the power plant. In this system, the flue gas is added to an oxidant supply and the combined gas is used as the feed gas for the cathode of the molten carbonate fuel cell. The electrochemical reaction in the fuel cell then results in the carbon dioxide in the feed gas being transferred from the cathode to the anode of the fuel cell. The anode exhaust gas thus becomes highly concentrated with carbon dioxide gas. This permits the carbon dioxide gas to be efficiently separated form the exhaust gas and to then be disposed of or converted to a form where it can put to a useful purpose.

The system of the '793 patent uses an externally reforming fuel cell system. The external reformer generates flue gas. For efficient $CO_2$ recovery, the reforming fuel also needs to be recycled to the fuel cell oxidant supply line. In addition, this invention adds the ambient temperature air required by the fuel cell to the fossil fuel power plant exhaust. This requires further preheating of the oxidant feed to the fuel cell to realize the required operating temperature. The separate air addition and external reforming of '793 both add complexity and cost to the system. They also reduce the efficiency of the system.

It is therefore an object of the present invention to provide an integrated power production system comprised of a fossil fuel power plant and carbonate fuel cell which attempts to alleviate the aforesaid disadvantages.

It is a further object of the present invention to provide an integrated power production system comprised of a fossil fuel power plant and carbonate fuel cell which is less complex and has improved efficiency.

SUMMARY OF THE INVENTION

In accordance with the principles of the present invention, the above and other objectives are realized in an integrated power production system comprised of a fossil fuel power plant and a carbonate fuel cell, preferably with internal reforming, having an anode and a cathode section, in which the inlet gas to the cathode section of the fuel cell contains exclusively flue exhaust gas from the fossil fuel power plant. Anode exhaust gas leaving the anode section of the fuel cell contains concentrated carbon dioxide gas and is subjected to further processing.

In one form of further processing, the anode exhaust gas is processed to sequester or segregate the carbon dioxide gas and then dispose of the sequestered gas. In another form of this processing, the anode exhaust gas is carried to a carbon dioxide tolerant low temperature fuel cell for use as fuel. In yet another form of processing, the anode exhaust gas is passed through a carbon dioxide separator to remove and sequester the carbon dioxide and to recycle the remaining exhaust gas to the anode of the fuel cell. In still another form of processing, the anode exhaust gas is passed through a combustor to convert hydrogen and carbon monoxide in the exhaust gas to carbon dioxide and thereafter the combustor output is subjected to carbon dioxide sequestration and removal.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
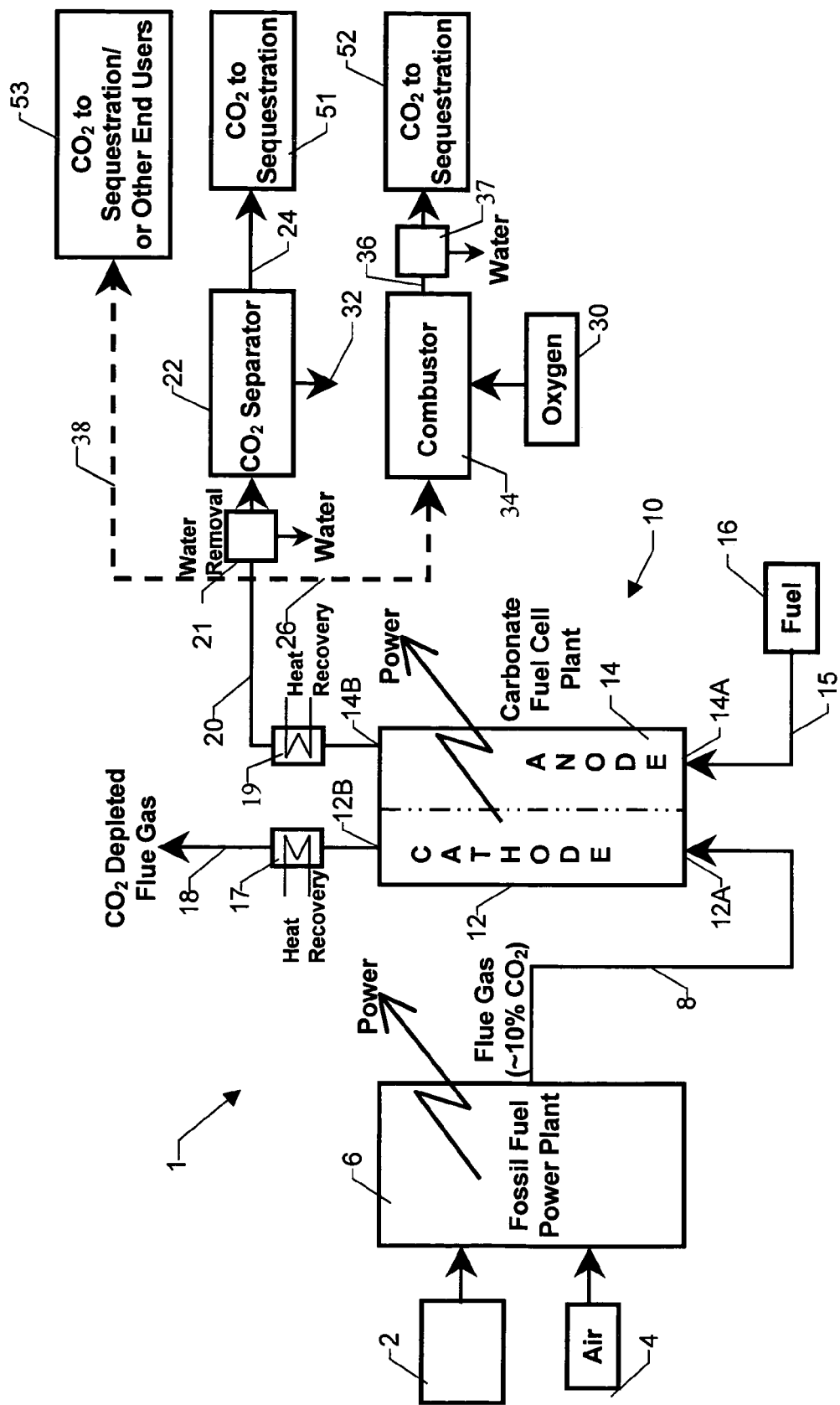
FIG. 1 shows an integrated power production system comprised of a fossil fuel power plant and a carbonate fuel cell in accordance with the principles of the present invention.

FIG. 1 shows an integrated power production system 1 in accordance with the principles of the present invention. The system 1 includes a fossil fuel power plant 6 and a carbonate fuel cell assembly 10 having a cathode section 12 and an anode section 14. As shown, the fuel cell 10 is an internally reforming or a direct molten carbonate fuel cell in which the fuel for the anode is internally reformed in the assembly. However, an externally reforming carbonate fuel cell assembly can also be employed in which case a reformer would be used to reform the fuel prior to delivery to the fuel cell anode section.

In accord with the principles of the present invention, the fossil fuel power plant 6 and the fuel cell assembly 10 are arranged in tandem such that the cathode section 12 of the assembly is supplied exclusively with flue exhaust gas from the power plant. This arrangement will be discussed in greater detail herein below.

As shown in FIG. 1, fossil fuel such as coal, natural gas or other hydrocarbon fuel is delivered to the fossil fuel power plant 6 from a fossil fuel supply 2 along with air delivered from an air supply 4. The fossil fuel and air undergo a combustion reaction in the power plant 6 producing power and resulting in an output flue gas exhaust. The flue gas exhaust typically comprises approximately 10% carbon dioxide, 19% water, and 9% oxygen, with the balance nitrogen. The exact amounts of these components will depend upon the type of fossil fuel and the amount of air from the air supply 4. The oxygen content can be varied by adjusting the air supply 4.

A line 8 couples a part or all of the flue exhaust gas to the inlet 12A of the cathode section 12 so that the flue gas is the exclusive oxidant gas supply to the inlet. At the same time, fuel from a supply 16, such as coal gas, natural gas or other hydrogen-containing fuel, is delivered over a line 15 to an inlet 14A of the anode section 14.

As can be appreciated, in the fuel cell assembly 10 the flue gas exhaust in the cathode section 12 and the reformed hydrogen in the anode section 14 undergo an electrochemical reaction to produce a power output. Also, this electrochemical reaction results in a substantial portion (approximately 65 to 75% or more) of the carbon dioxide in the flue gas being transferred from the cathode section to the anode section of the cell.

More particularly, the carbon dioxide and oxygen in the flue gas react in the cathode section 12 of the fuel cell to produce carbonate ions which are carried to the anode section 14 of the cell through the fuel cell electrolyte. At the anode section 14, the carbonate ions are reduced with hydrogen from the fuel to produce water and carbon dioxide. The net result is the above-mentioned transfer of a substantial portion of the carbon dioxide in the flue gas from the cathode section to the anode section. Anode exhaust gas at the outlet 14B of the anode compartment of the fuel cell 10 is thus high in concentration of carbon dioxide, thereby permitting the carbon dioxide gas to be more easily and efficiently recovered for disposal or for conversion to a form having a useful purpose.

Specifically, flue gas depleted of carbon dioxide exits the cathode section 12 through a cathode outlet 12B via a line 18. The anode exhaust gas containing predominantly carbon dioxide as well as unreacted hydrogen, carbon monoxide, water vapor and trace amounts of other gases, on the other hand, exits the anode outlet 14B and is conveyed by line 20 for further processing. This processing includes sequestration or segregation of all or part of the carbon dioxide in the gas which can now be carried out more efficiently due to its high concentration.

Because the cathode and anode gases exit the fuel cell at high temperature, all or part of the sensible heat from these streams is recovered by unit 17 and unit 19. Unit 17 is similar to the economizer section of a fossil fuel power plant boiler or HRSG (heat recovery steam generator). In fact, unit 17 could remain integrated with the power plant equipment, especially when this invention is applied to existing power plants. Recovery of the heat is not required, but is desirable to maximize efficiency and minimize $CO_2$ emissions per KW of power produced.

FIG. 1 shows various forms of processing the anode exhaust gas. More particularly, the anode exhaust gas is carried by the line 20 to a carbon dioxide separator 22 where the carbon dioxide gas in the exhaust is separated from the other gases in the exhaust and output to a line 24. Typically, the gas is cooled prior to entering the carbon dioxide separator 22 so that the water in the gas condenses to liquid and is readily removed by water separator 21. This increases the concentration of the $CO_2$ and makes separation easier. The line 24 takes the carbon dioxide gas to a sequestration processing assembly 51 where the gas is disposed of or converted to a form having a useful purpose. The remaining gases in the anode exhaust gas are mainly fuel composed of hydrogen and carbon monoxide and are carried by a line 32 from the system. Optionally, they can be sent to a combustor 34 which is also supplied with air or oxygen from an oxygen supply 30. Combusting with oxygen has the advantage of eliminating contamination of the carbon dioxide with nitrogen in the air. Carbon dioxide and water are the products of the combustion reaction in the combustor 34 and the carbon dioxide is carried by line 36 also to sequestration processing in an assembly 52. Prior to $CO_2$ sequestration, the gas may be cooled and the water removed in unit 37.

In another form of the processing shown in FIG. 1, all of the anode exhaust gas is coupled directly to the combustor 34, as shown by dotted line 26, without passing through the carbon dioxide separator 22 or water removal unit 21. In the combustor 34, carbon monoxide and unreacted hydrogen are reacted with oxygen from the oxygen supply 30 to produce additional carbon dioxide. The combusted gas, having a high carbon dioxide concentration, leaves the combustor 34 through the line 36 for sequestration processing, as above discussed. This eliminates the need for a $CO_2$ separator to generate a concentrated $CO_2$ stream for sequestration.

Alternatively, in another processing form, the anode exhaust gas is conveyed to sequestration processing in assembly 53 or other end uses without undergoing carbon dioxide separation or combustion processes. This is shown by dotted line 38 in FIG. 1.

As an example of the sequestration processing mentioned above, carbon dioxide gas is disposed of by deploying it into a deep saline formation or depleted oil and gas wells. Anode exhaust gas may also be used in other processes such as enhanced oil recovery.

Figure 2:
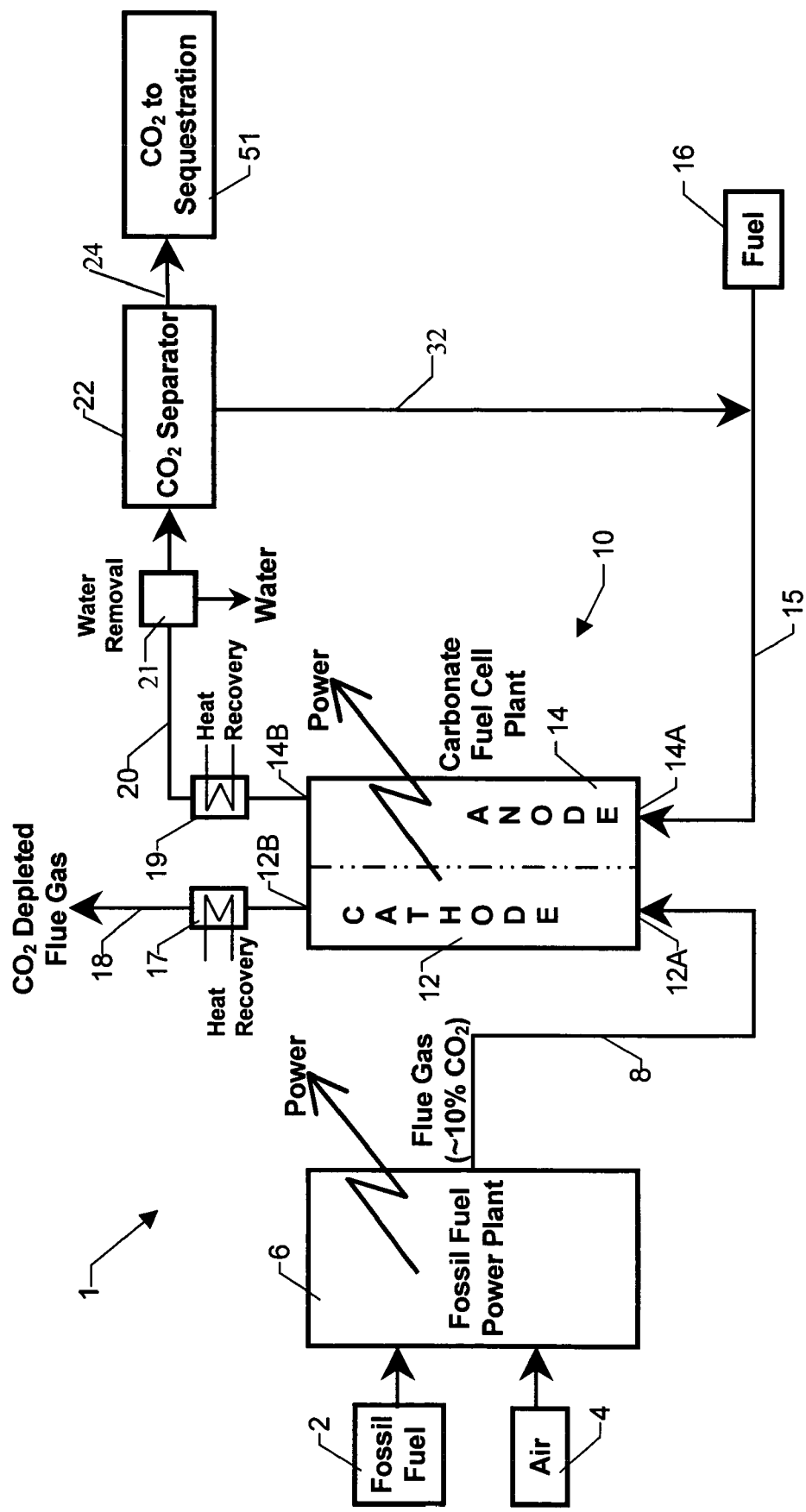
FIG. 2 shows an alternative arrangement of the integrated power production system shown in FIG. 1.

FIG. 2 shows a modified arrangement of the power production system of FIG. 1. The system of FIG. 2 differs from the system of FIG. 1 in that instead of the output gases in the line 32 from the separator 22 being supplied to a combustor, the gases are recycled to the fuel inlet line 15 where they are added to the fuel supply for the anode section. As can be appreciated, the removal of carbon dioxide from the anode exhaust gas and subsequent recycling of the anode exhaust gas to the fuel cell anode improves the overall efficiency of the system 1 by reducing the amount of fuel required from the fuel supply 16.

Figure 3:
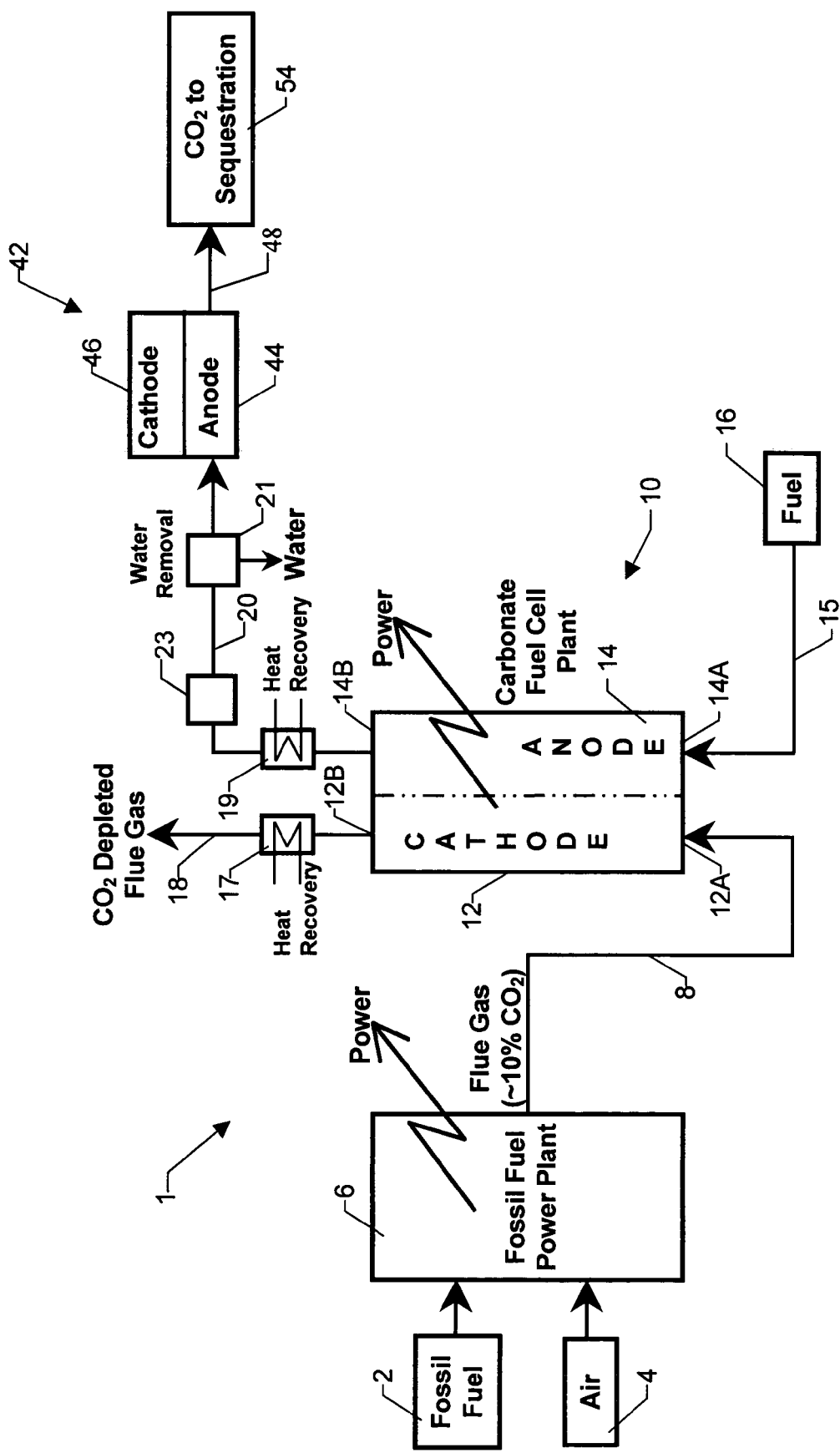
FIG. 3 shows another arrangement of the system of FIG. 1 incorporating a carbon dioxide tolerant low temperature fuel cell.

FIG. 3 is another arrangement of the integrated power production system 1 of FIG. 1. In this case, anode exhaust gas from the fuel cell anode section 14 is used as a fuel source for a carbon dioxide tolerant low temperature fuel cell 42, such as, for example, phosphoric acid or proton exchange membrane fuel cells. More particularly, the line 20 carrying the anode exhaust gas conveys the gas to the anode section 44 of the low temperature fuel cell 42. In the fuel cell 42, the electrochemical reaction that occurs results in an increase in the concentration of carbon dioxide in the resultant anode exhaust gas as well as generating additional power and increasing efficiency. The anode exhaust gas is then carried by the line 48 to carbon dioxide sequestration assembly 54. As shown, a shift unit 23 may be included in the anode gas cooling system. Such a system converts CO and H2O in the anode gas to CO2 and H2 which can improve the low temperature fuel cell performance As can be appreciated, the system 1 of the invention as shown in FIGS. 1-3 may be further modified depending on the fossil fuel being processed by the fossil fuel power plant 6, and on the relative size of the power plant 6 and the fuel cell assembly 10. Particularly, the proper sizing of the power cycles between the fossil fuel power plant 6 and the fuel cell assembly 10 allows for efficient power production from fossil fuels combined with isolation of more than ⅔ of carbon dioxide present in the fossil fuel. Two examples of the integrated power production system are described below.

EXAMPLE 1

In this example, the system 1 was configured to combine a coal processing power plant 6 in a tandem arrangement with a molten carbonate fuel cell 10 as shown in FIG. 2. Natural gas is delivered to the fuel cell anode 14 from the fuel supply 16. In this arrangement, the coal processing power plant 6 is a conventional combustion turbine adapted to run on gasified coal and produces approximately 70% of the total power produced by the system 1, while the fuel cell 10 produces approximately 30% of the total power.

The system 1 in this example is provided with a carbon dioxide recovery assembly comprising a carbon dioxide separator 22 as shown in FIG. 2. In addition, after the removal of carbon dioxide in the carbon dioxide separator 22, anode exhaust gas is recycled back to the anode inlet 14A. Although not shown, a small portion of the exhaust gas from separator 22 can be vented out side to prevent accumulation of inert gases such as nitrogen in the fuel stream.

In this example, approximately 75% of the carbon dioxide produced by the coal processing power plant 6 can be separated and sequestered, thereby avoiding its emission into the atmosphere. Approximately 65% of the total fuel carbon, coal gas plus natural gas, is captured.

A system analysis was carried out on the integrated system 1 in accordance with the present invention using the configuration described in this example. This system analysis was then compared with the system analysis for a conventional combustion turbine combined cycle operating on coal gas and for a fuel cell assembly operating on natural gas with no carbon dioxide recovery. The following efficiencies and carbon dioxide emission rates were obtained for these systems:

| Power Cycle | System Efficiency (LHV) | $CO_2$ Emission (Lb/kWh) |
|---|---|---|
| Conventional combustion turbine combined cycle | 52.8%* | 1.85 |
| Simple Cycle natural gas fuel cell | 50.0% | 0.87 |
| Combustion turbine + fuel cell with sequestration system of Example 1 and coal gas to combustion turbine | 55.3% | 0.53 |

*efficiency based on coal gas to turbine and does not include gasification efficiency losses As can be seen from the above carbon dioxide emission rates, an overall 65% reduction in carbon dioxide emissions was obtained by using the tandem arrangement of the coal processing unit 6 and the fuel cell 10 as described in this example. In addition, the efficiency of the system 1 is higher than the efficiency of a conventional coal power plant 6 or fuel cell 10 used alone due to recycling of fuel to the fuel cell.

EXAMPLE 2

In this example, the system 1 comprises a conventional natural gas power plant 6 arranged in tandem with a molten carbonate fuel cell 10 operating on natural gas. The natural gas power plant 6 in this example comprises a conventional combustion turbine which combusts natural gas to produce power. Carbon dioxide in the anode exhaust gas produced by this system 1 is transferred out of the system 1 and sequestered as shown in FIG. 2. Although not shown in the figure, a portion of the $CO_2$ separated from the anode gas is sent to the cathode inlet to maintain the required $CO_2$ concentrations for efficient fuel cell operation. The remainder of the $CO_2$ is sequestered. The system configuration in this example again achieves approximately 65% reduction in carbon dioxide emissions and achieves a very low emissions level of 0.27 lbs of $CO_2$/kwh.

A system analysis was carried out on the integrated system described in this example and compared with the system analyses for a conventional combustion turbine combined cycle and for a fuel cell, each operating on natural gas. The following efficiencies and carbon dioxide emission rates were obtained for these systems:

| Power Cycle | System Efficiency (LHV) | $CO_2$ Emission (Lb/kWh) |
|---|---|---|
| Conventional combustion turbine | 56.3% | 0.77 |
| Simple Cycle Natural gas fuel cell | 50.0% | 0.87 |
| Combustion turbine + Fuel cell sequestration system of Example 2 with natural gas to combustion turbine | 57.2% | 0.27 |

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. An integrated power production system comprising:
    a fossil fuel power plant producing an output flue gas containing carbon dioxide and oxygen;
    a carbonate fuel cell having an anode section and a cathode section;
    wherein the inlet gas to the cathode section of said carbonate fuel cell contains exclusively all or part of the output flue gas produced by said fossil fuel power plant.

2. An integrated power production system according to claim 1, wherein said fuel cell is an internal reforming molten carbonate fuel cell.

3. An integrated power production system according to claim 1, wherein said anode section of said fuel cell outputs anode exhaust gas and further comprising a carbon dioxide separator receiving the anode exhaust gas from said anode section of said fuel cell for separating the carbon dioxide gas in said anode exhaust gas from said anode exhaust gas.

4. An integrated power production system according to claim 3, further comprising an assembly for cooling and shifting the anode exhaust gas from said anode section of said fuel cell prior to said anode exhaust gas from said anode section of said fuel cell being received in said carbon dioxide separator.

5. An integrated power production system according to claim 3, further comprising a sequestration assembly for sequestering carbon dioxide separated by said carbon dioxide separator.

6. An integrated power production system according to claim 3, further comprising a recycling assembly for recycling anode exhaust gas to said anode section of said fuel cell after the carbon dioxide gas has been separated from said anode exhaust gas by said carbon dioxide separator.

7. An integrated power production system according to claim 6, further comprising a sequestration assembly for sequestering the carbon dioxide separated by said carbon dioxide separator.

8. An integrated power production system according to claim 3, further comprising a combustor for combusting with oxygen the anode exhaust gas after the carbon dioxide gas has been separated from said anode exhaust gas by said carbon dioxide separator.

9. An integrated power production system according to claim 8, further comprising a first and second sequestration assemblies for sequestering the carbon dioxide separated by said carbon dioxide separator and the carbon dioxide in the output of said combustor.

10. An integrated power production system according to claim 2, further comprising a combustor for combusting with oxygen the anode exhaust gas from said anode section of said fuel cell such that the carbon dioxide in the output gas of said combustor can be separated by cooling said output gas.

11. An integrated power production system according to claim 1, further comprising a sequestration assembly for sequestering the carbon dioxide in the anode exhaust gas from said anode section of said carbonate fuel cell.

12. An integrated power production system according to claim 1, further comprising:
a low temperature fuel cell including a cathode and an anode; and
wherein the anode exhaust gas from said anode section of said carbonate fuel cell serves as the inlet gas for said anode of said low temperature fuel cell.

13. An integrated power production system according to claim 12, wherein said low temperature fuel cell is a carbon dioxide tolerant fuel cell.

14. An integrated power production system according to claim 12, further comprising a sequestration assembly for sequestering the carbon dioxide in the anode exhaust gas of said anode of said low temperature fuel cell.

15. An integrated power production system according to claim 1, wherein said fossil fuel power plant processes one of coal gas and natural gas and wherein one of coal gas and natural gas is inputted into said anode section of said fuel cell.

16. An integrated power production system according to claim 1, wherein said fossil fuel power plant comprises a combustion turbine.

17. An integrated power plant production system in accordance with claim 1, further comprising an air supply for supplying air to said fossil fuel power plant.

* * * * *